Dec. 1, 1959

E. UMBRICHT ET AL 2,915,252

FINE DROPLET DISPERSING SYSTEM

Filed Jan. 19, 1955

INVENTORS
EMIL UMBRICHT
GERRIT STEENHAGEN
WILLARD L. JOHNSON
BY

ATTORNEYS

United States Patent Office 2,915,252
Patented Dec. 1, 1959

2,915,252

FINE DROPLET DISPERSING SYSTEM

Emil Umbricht, Jackson, Gerrit Steenhagen, Dearborn, and Willard L. Johnson, Royal Oak, Mich., assignors to Ajem Laboratories, Inc., Detroit, Mich.

Application January 19, 1955, Serial No. 482,714

9 Claims. (Cl. 239—500)

The present invention relates to liquid dispersing method and apparatus for generating and dispersing large volumes of fine droplets. This invention is described in detail as embodied in a liquid dispersing nozzle and screen system for generating and substantially uniformly dispersing large amounts of fog droplets in a gaseous medium, for example, for the purpose of removing impurities from the gas or for interacting the dispersed liquid and gas.

The system described is particularly well suited for use in dispersing water droplets as a preliminary spray for use in cooling and washing industrial exhaust gases to remove various contaminating agents and suspended particles, such as are present in the gases which are discharged from certain industrial processes.

The system is particularly effective where very large volumes of gas are involved and large amounts of particles are entrained in each cubic foot. For example, in the steel and fabrication industries scarfing operations are widely used and are carried on substantially continuously, resulting in large volumes of heated exhaust air and gases containing dense clouds of iron oxide particles. These large quantities of particles are very difficult to remove from the exhaust air, and in the past have blanketed the areas around steel and fabrication plants with a layer of fine rusty dust.

Mechanical screens and filters have proven impractical to overcome contamination problems where large volumes of dense particles are involved because such large unwieldy areas of filter elements are required, and the dense clouds of particles rapidly clog up the filters, quickly dropping their efficiency and requiring excessive change, and replacement, etc.

Recently, banks of air washing machines, such as are disclosed in the application of Emil Umbricht, Serial No. 399,971, now Patent No. 2,789,866, filed December 23, 1953, have been used to wash the exhaust air from such plants and have proven remarkably successful in overcoming this difficult problem of removing the iron oxide particles. However, even with the use of such machines, there are still certain problems in handling the exhaust from scarfing operations, for the iron oxide particles and air are at elevated temperatures, making the wetting of the particles difficult because of the low water absorption which occurs on the surface of these particles at elevated temperatures. Also, the elevated temperatures tend to heat up the washing solution which is recirculated in the washing machines, causing a loss of the surfactants which are often included to enhance the washing operation.

We have found that the use of a number of nozzle and screen dispersing systems, such as are described herein, in a pre-washing spray operation to disperse fog droplets throughout the exhaust air before it is passed through the air washing machines produces an increased efficiency in the use of the machines and prevents the escape of any significant amounts of iron oxide particles. These fog droplets substantially cool the exhaust air and particles and serve thoroughly to wet the particles and partially to agglomerate them into larger masses of wet particles before they reach the washing machines. Thus, during the washing operation, fewer free small particles remain and all of the particles are more quickly and easily removed from the exhaust air because of their lower temperature and wet condition.

Among the many advantages of the liquid dispersing nozzle and screen system described herein are those resulting from the fact that it generates and uniformly disperses a large volume of fine high velocity fog droplets, all approximately of the same size and which are most effective in cooling the exhaust air and wetting the suspended particles. The fog droplets are of sufficient size to maintain their momentum and effectively permeate uniformly throughout the exhaust air and thoroughly wet the suspended particles.

We have found that with droplets in a finely atomized state the droplets quickly lose their momentum so that their action in wetting the iron oxide particles is not efficient. Moreover, such very tiny droplets have relatively large surface areas in proportion to their mass and tend to evaporate completely in the heated exhaust air, so that very little wetting action is then attained.

On the other hand, when the fog droplets in the pre-spray are relatively large, they have much smaller effective surface area, and the amount of cooling is reduced. Moreover, the fewer large particles collide with fewer numbers of the iron oxide particles, reducing the desired wetting action.

The nozzle and screen system disclosed herein is advantageous in producing a uniform widely dispersed spray of fog droplets of relatively high velocity and of a size which produces the desired cooling and also the desired wetting action on the iron oxide particles.

Among the further advantages of the nozzle and screen arrangement described is that the fog droplets are projected therefrom at a relatively wide angle of divergence and, during their generation, are unconfined, thus enabling the droplets to maintain their maximum momentum as they are projected out into the exhaust air.

A still further advantage of the described method of dispersing liquid into a large number of substantially uniformly sized fog droplets results from the steps of generating a diverging stream of approximately uniformly large sized droplets, dividing these droplets to form a second more rapidly diverging stream of finer droplets of approximately uniform size, and again dividing these finer droplets into a third more rapidly diverging stream of fog droplets, whereby the desired size and momentum of the fog droplets is efficiently obtained.

The apparatus described is uncomplicated, inexpensive, rugged, self cleaning in operation, and avoids the use of fine orifices and confined chambers which are subject to clogging.

The various aspects, features and advantages of the present invention will be more fully understood from a consideration of the following description in conjunction with the accompanying sheet of drawings in which:

Figure 1 is a perspective view of a nozzle and screen system for generating fog particles, embodying the present invention;

Figure 2 is a plan view of the system shown in Figure 1; and

Figure 3 is a front end view of the system shown in Figures 1 and 2.

The system includes generally a nozzle portion, indicated at 10, a first screen 12, and a second larger screen 14, both screens being held in spaced relation and supported in front of the nozzle portion 10 by means of three support bars 16, 18 and 20 arranged generally in tripod fashion and projecting from the base 22 of the nozzle 10.

In operation, the water is supplied under high pressure through a supply pipe 24 and is squirted out through a large hole 25 in the side of the pipe (not shown) which is aligned with a large orifice 26 in the curved front part of the base 22. The large solid jet of water issuing from the orifice 26 is spread into a cone 28 of substantially uniform large droplets by a bullet-shaped director 30, generally of a type as described in detail and claimed in an application of Emil Umbricht filed February 2, 1953, Serial No. 334,420, and now issued as Patent No. 2,788,685, dated January 22, 1957, except that the present director 30 may advantageously be somewhat smaller with respect to liquid jet than directors as shown in said prior Umbricht patent.

The bullet-shaped director 30 is positioned by means of a U-shaped bracket 32 straddling the orifice 26 so that its streamlined nose portion is directly in front of and pointing toward the large orifice 26. The jet of water from the orifice strikes the streamlined surface of the director 30 at an angle of incidence less than that which would cause the water to be dispersed into a fine lateral spray. The water follows around the surface of the director and breaks into an expanding cone 28 of large sized droplets of substantially uniform size which, a short distance beyond the director are substantially evenly distributed over the cross-sectional area of the cone 28. The drops formed are predominantly large in size and the velocity of the water in the jet from the orifice 26 is not greatly reduced by the director, so that the individual drops of water in the stream 28 have high velocity and substantial momentum. No substantial amount of very fine spray is produced. In the present example, the major portion of the water issuing from the orifice 26 is formed into drops having diameters in the range from about $1/16$ to $1/8$ inch.

The first screen 12 serves to divide these droplets into smaller droplets of substantially uniform size in an intermediate truncated cone 34 which diverges somewhat more rapidly than the first cone 28.

An advantage of this method is that the initial cone 28 is not confined. There is no loss of momentum of the droplets in cone 28 or tendency to reform them into solid streams of water due to collision with confining walls. Thus, as the cone 28 strikes the screen 12 the droplets are of substantially uniform size and momentum, and consequently the smaller droplets in the cone 34 are of substantially uniform smaller size due to the uniform conditions which are present over the surface of the screen 12 as the cone 34 is being generated.

Moreover, the cone 28 is allowed to expand into a large cross-sectional area before striking the screen 12. Thus, the present system avoids to a considerable extent any interaction between the droplets in the cone 28 as they strike the screen 12. Each drop from the cone 28 in effect individually strikes the mesh of the screen 12 and becomes divided as it passes into the truncated cone 34, consequently the reduction in velocity due to passage through the large area screen 12 is reduced from that which occurs where the water is confined in a pipe before striking such a screen, or where a substantially solid stream impinges on such a screen.

When the droplets in cone 34 strike the second screen 14 they are again divided, forming the desired uniform sized high-speed fog droplets, diverging from the screen 14 in a third truncated cone 36. The screen 14 is considerably larger than the screen 12 and is spaced from it so that the advantageous uniform relationships which are present at the screen 12 are again present at the screen 14 and the loss of momentum in passing through the screen 14 is again minimized by its larger area and lack of interaction of the drops in the stream 34 at the surface of the screen 14.

In the system shown, the first screen 12 has a mesh of the size of 30 lines per inch and the second screen 14 has a mesh of 40 lines per inch.

In some instances, depending upon the size of the contaminating particles being wetted, the mesh size of the first screen 12 may desirably be changed to a value in the range from about 10 to about 40 openings per inch and the second screen 14 may have a mesh size in the range from about 20 to about 50 openings per inch. Preferably, the second screen has a mesh at least as fine as that of the first screen and, as shown, a somewhat finer mesh may often be used to advantage.

Moreover, in order to maintain the desired momentum of the droplets in the cones 28, 34, and 36, substantial divergence of the incident cones should occur before the droplets strike each screen. As shown, the distance from the end of the director 30 to the first screen is labeled "A" and the distance between the screens is "B," and the distance from the orifice to the first screen is "C." We have found that the relationship of these distances is important in obtaining the desired uniform dispersal.

The distance "A" should be sufficient to enable the cone 28 to diverge to a large area, relative to the area of the orifice 26. We have found that the distance "A" should be at least 10 times and "C" at least 12 times the diameter of the orifice and, as shown, "A" is more than 15 times this diameter from the end of the director. The screen 12, as shown, is spaced a distance "C" from the orifice 26 which is more than 20 times the diameter of the orifice. The area of the screen 12 should be at least 100 times the area of the orifice 26, and it is usually preferable to have at least 200 times this area. For example, as shown, the area of the screen is about 400 times the area of the orifice 26. As shown, the diameter of the screen 12 is 10½ inches and the distance "A" is 7¾ inches with an orifice diameter of ½ inch. The distance "B" should lie in the range from about "A/2" to about "3A" and in most applications, it is advantageous to maintain the ratio of "B" to "A" in the range from about 1:1 to 2:1. As shown, "B" is 12 inches, i.e., it is 1.54A. The screen 14 has a diameter of almost twice that of the screen 12; as shown it is 19 inches. These latter ranges have proven particularly advantageous for use in overcoming the problem of removing iron oxide from the exhaust in scarfing operations.

The screens 12 and 14 are formed of materials resistant to corrosion under the conditions of use, for example, such as bronze wire, stainless steel alloy wire, and plastic monofilament such as Saran and are supported at their peripheries by pairs of annular rings 37 pressed face to face with the edge of the screen sandwiched therebetween, the pairs of rings then being spot welded together on one inch centers. The base 22 of the nozzle includes a generally L-shaped arm 38 through which is threaded a clamping screw 40 adjustably to lock the orifice 26 at the desired position over the hole (not shown) in the pipe 24.

The upper support bar 16 has one end welded along the side of L-shaped arm 38 and then is bent outwardly at an angle of about 10 to 15 degrees. The lower support bars 18 and 20 are formed from a single rod bent into a V-shape with a short cross piece near the apex of the V welded to the edge of the base 22 opposite the arm 38. The effective angle of divergence of lines touching the perimeters of the screens 12 and 14 at diametrical positions lies in the range from about 30 to about 50 degrees, and, as shown, this angle is 40 degrees.

From the foregoing description, it will be understood that the present invention is well adapted to provide the many advantages and features described above and that by means of various changes, the nozzle and screen assembly described can be adapted for a wide variety of applications in accordance with the teachings of this specification, and that the scope of the present invention includes such modifications and changes as claimed.

What is claimed is:

1. Fine droplet dispersing apparatus comprising liquid conducting means having operatively associated therewith spray-producing nozzle means arranged to produce a diverging spray of droplets, a first screen spaced from said nozzle means and positioned normal to the direction of flow of said spray for intercepting said spray, said first screen having an area at least as large as the area of the spray at its location, and a second screen spaced from said first screen for intercepting the spray passing through said first screen, said second screen having an area at least as large as the area of spray at its location.

2. Fine droplet dispersing apparatus comprising liquid conducting means with a passage having operatively associated therewith spray-producing nozzle means arranged to produce a diverging spray of droplets, a first screen spaced from said nozzle means and positioned normal to the direction of flow of said spray for intercepting said spray, said first screen having an area at least as large as the area of the spray at its location, said area being at least 100 times the cross sectional area of said passage, and a second screen spaced from said first screen for intercepting the spray passing through said first screen, said second screen having an area at least as large as the area of spray at its location, the area of said second screen being larger than the area of said first screen.

3. Fine droplet dispersing apparatus comprising liquid conducting means with a passage having operatively associated therewith spray-producing nozzle means arranged to produce a diverging spray of droplets, a first screen spaced from said nozzle means and positioned normal to the direction of flow of said spray for intercepting said spray, said first screen having an area at least as large as the area of the spray at its location and being positioned at a distance from said nozzle means which is at least 10 times the diameter of said passage, and a second screen spaced from said first screen for intercepting the spray passing through said first screen, said second screen having an area at least as large as the area of spray at its location.

4. Fine droplet dispsersing apparatus comprising liquid conducting means including a passage having operatively associated therewith spray-producing nozzle means arranged to produce a diverging spray of droplets, a first screen spaced from said nozzle means and positioned normal to the direction of flow of said spray for intercepting said spray, said first screen having an area at least as large as the area of the spray at its location and being positioned at a distance from said nozzle means which is at least 10 times the diameter of said passage, and a second screen spaced from said first screen for intercepting the spray passing through said first screen, said second screen having an area at least as large as the area of spray at its location, and the distance between said first and second screens being in the range from one-half to three times the distance from said nozzle means to said first screen.

5. Fine droplet dispersing apparatus comprising liquid conducting means defining a passage having operatively associated therewith spray-producing nozzle means arranged to produce a diverging spray of droplets, a first screen spaced from said nozzle means and positioned normal to the direction of flow of said spray for intercepting said spray, said first screen having an area at least as large as the area of the spray at its location and having a mesh size in the range from 10 to 40 openings per inch, the distance from said nozzle means to said first screen being at least 10 times the diameter of said passage, and a second screen spaced from said first screen for intercepting the spray passing through said first screen, said second screen having a mesh size in the range from 20 to 50 openings per inch and having an area at least as large as the area of spray at its location, said second screen being spaced from said first screen by a distance at least one-half the distance from said nozzle means to said first screen.

6. Fine droplet dispersing apparatus as claimed in claim 5 wherein said liquid conducting means is a cylindrically curved base having a concave surface adapted to seat over a pipe and having a passage through said concave surface, clamping means opposed to said concave surface adapted to hold said curved base seated against the pipe, a plurality of diverging support elements projecting from said cylindrical base and secured to said first and second screen for supporting said screens.

7. Liquid dispersing apparatus comprising passage means for confining the flow of liquid, means defining an orifice communicating with said passage means, a bullet-shaped director having its nose aligned with and facing said orifice in spaced relationship therefrom for diverging the liquid into a cone of droplets, a first screen spaced a predetermined distance from said director and arranged to intercept said cone, said predetermined distance being at least twelve times the effective size of said orifice, said screen having a mesh size in the range from about ten to about forty lines per inch, and a second screen spaced from said first screen a distance in the range from about one half to three times said predetermined distance and arranged to intercept the droplets from the first screen, said second screen being substantially larger than said first screen, and having a mesh size in the range from about twenty to about fifty lines per inch.

8. Liquid dispersing apparatus as claimed in claim 7 and wherein said screens are round and are supported from said nozzle by means of diverging support bars, said nozzle, support bars, and screens defining a generally conical pattern.

9. Liquid dispersing apparatus as claimed in claim 8 and wherein lines touching the perimeters of said screens at diametrically spaced points diverge at an angle in the range from about thirty to about fifty degrees.

References Cited in the file of this patent

UNITED STATES PATENTS

| | | |
|---|---|---|
| 40,644 | Rusco | Nov. 17, 1863 |
| 418,477 | Strebeck | Dec. 31, 1889 |
| 654,132 | Bush | July 24, 1900 |
| 1,337,589 | Burbank | Apr. 20, 1920 |
| 2,210,846 | Aghnides | Aug. 4, 1940 |
| 2,302,021 | Freeman | Nov. 17, 1942 |
| 2,314,357 | Lehman | Mar. 23, 1943 |
| 2,690,930 | Corson | Oct. 5, 1954 |
| 2,778,685 | Umbricht | Jan. 22, 1957 |
| 2,829,874 | Freeman | Apr. 8, 1958 |

FOREIGN PATENTS

| | | |
|---|---|---|
| 187,358 | Great Britain | Oct. 26, 1922 |